United States Patent
Perales-Huerta

(10) Patent No.: US 11,897,410 B2
(45) Date of Patent: Feb. 13, 2024

(54) DEPLOYMENT FLAP FOR AIRBAG MODULE

(71) Applicant: ZF Passive Safety Systems US Inc., Washington, MI (US)

(72) Inventor: Alejandro Perales-Huerta, Rochester Hills, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 0 days.

(21) Appl. No.: 17/488,566

(22) Filed: Sep. 29, 2021

(65) Prior Publication Data

US 2023/0094687 A1    Mar. 30, 2023

(51) Int. Cl.

| | |
|---|---|
| *B60R 21/206* | (2011.01) |
| *B60R 21/217* | (2011.01) |
| *B60R 21/231* | (2011.01) |
| *B60R 21/201* | (2011.01) |
| *B60R 21/16* | (2006.01) |

(52) U.S. Cl.
CPC .......... *B60R 21/217* (2013.01); *B60R 21/201* (2013.01); *B60R 21/206* (2013.01); *B60R 21/2171* (2013.01); *B60R 21/2176* (2013.01); *B60R 21/231* (2013.01); *B60R 2021/161* (2013.01); *B60R 2021/23169* (2013.01)

(58) Field of Classification Search
CPC ... B60R 21/206; B60R 21/217; B60R 21/231; B60R 21/201; B60R 21/2176; B60R 21/2171; B60R 21/205; B60R 2021/23169; B60R 2021/161

USPC ........................ 280/743.2, 732, 730.1, 728.2
See application file for complete search history.

(56) References Cited

U.S. PATENT DOCUMENTS

| | | | |
|---|---|---|---|
| 6,070,904 A * | 6/2000 | Ozaki | B60R 21/16 |
| | | | 280/743.1 |
| 10,960,843 B2 * | 3/2021 | Esparza | B60R 21/2165 |
| 11,358,557 B1 * | 6/2022 | Parker | B60R 21/207 |
| 2010/0102541 A1 * | 4/2010 | Shimizu | B60R 21/201 |
| | | | 280/728.3 |
| 2011/0193328 A1 * | 8/2011 | Fukawatase | B60R 21/206 |
| | | | 280/730.2 |

* cited by examiner

*Primary Examiner* — Keith J Frisby
(74) *Attorney, Agent, or Firm* — TAROLLI, SUNDHEIM, COVELL & TUMMINO L.L.P.

(57) ABSTRACT

A knee airbag module includes an inflatable knee airbag, an inflator for inflating the knee airbag, a housing for supporting the knee airbag and inflator, a cover for enclosing the knee airbag in the housing, and a deployment flap positioned beneath the cover. The housing includes an opening through which the knee airbag deploys. The deployment flap is connected to the housing and spans across at least a portion of the opening. The knee airbag has a width that extends laterally beyond the lateral extent of the housing when the airbag is deployed. The knee airbag also includes a central portion that spans the width of the housing when the knee airbag is deployed. The deployment flap is configured to initially inhibit deployment of the central portion of the knee airbag while remaining portions of the knee airbag initially deploy. The deployment flap is configured to thereafter rupture and permit deployment of the central portion.

16 Claims, 6 Drawing Sheets

DEPLOYMENT FLAP FOR AIRBAG MODULE

TECHNICAL FIELD

The present invention relates to safety restraint systems for a vehicle, and more particularly, to a deployment flap for helping to control the deployment of a knee airbag.

BACKGROUND

It is known to deploy an inflatable vehicle occupant protection device, such as an airbag, upon the occurrence of an event for which occupant protection is desired, such as a vehicle collision or rollover. The airbag is part of a conventional vehicle occupant protection apparatus that includes a sensor and an inflation fluid source, such as an inflator. Upon sensing the occurrence of an event for which deployment of the airbag is desired, the inflation fluid source is actuated and produces inflation fluid that inflates the airbag, causing it to deploy into the vehicle occupant compartment to help protect the vehicle occupants.

One particular type of inflatable vehicle occupant protection device is a knee airbag. Knee airbags are typically stored in a housing or canister that is mounted in the area of the lower portion of the instrument panel and the vehicle foot well. Knee airbags are inflatable to a deployed condition in which the knee airbag is positioned between the occupant's legs and the instrument panel to help protect the vehicle occupant.

SUMMARY

A knee airbag module includes a housing that supports an inflator and a knee airbag. The knee airbag module is configured to be mounted in an instrument panel in the area of a footwell of the vehicle. The knee airbag is configured to deploy from the module and inflate to a position between the occupant's knees/lower legs and the instrument panel. The knee airbag module also includes a deployment flap configured to inhibit initial deployment of a central portion of the knee airbag while allowing initial deployment of inboard and outboard lateral portions of the knee airbag. The deployment flap is further configured to thereafter release the central portion of the knee airbag to deploy so that the central and lateral portions of the knee airbag deploy uniformly away from the instrument panel.

Space in the instrument panel is limited. Accordingly, the knee airbag module has a necessarily compact design. As a result, the width of the module is narrower than the width of the knee airbag when deployed. The central portion of the knee airbag spans, generally, the width of the module housing. The inboard and outboard lateral portions of the knee airbag are those portions that span inboard and outboard, respectively, beyond the central portion, i.e., beyond the width of the housing. While the central portion of the knee airbag deploys along a trajectory that is normal to the housing, i.e., toward the occupant, the lateral portions deploy along oblique trajectories, in directions that have both lateral and normal components with respect to the housing.

As a result, if the knee airbag is deployed without restriction, the central portion deploys ahead of the lateral portions and will reach the occupant (i.e., the occupant's knees/legs) before the lateral portions do so. If this occurs, the central portion can initially deploy between the occupants knees/legs, engaging and causing the knees/legs to move laterally away from each other. As this leg movement can be undesirable, it can be seen that configuring the central and lateral portions of the knee airbag to deploy more uniformly across their widths from the housing toward the occupant is desirable.

According to one aspect, a knee airbag module includes an inflatable knee airbag, an inflator for inflating the knee airbag, a housing for supporting the knee airbag and inflator, a cover for enclosing the knee airbag in the housing, and a deployment flap positioned beneath the cover. The housing includes an opening through which the knee airbag deploys. The deployment flap is connected to the housing and spans across at least a portion of the opening. The knee airbag has a width that extends laterally beyond the lateral extent of the housing when the airbag is deployed. The knee airbag also includes a central portion that spans the width of the housing when the knee airbag is deployed. The deployment flap is configured to initially inhibit deployment of the central portion of the knee airbag while remaining portions of the knee airbag initially deploy. The deployment flap is configured to thereafter rupture and permit deployment of the central portion.

According to another aspect, the remaining portions of the knee airbag can include a first lateral portion of the knee airbag that extends laterally from the central portion and laterally of the housing in a first direction, and a second lateral portion that extends laterally from the central portion and laterally of the housing in a second direction, opposite the first direction.

According to another aspect, the deployment flap can be configured to permit initial lateral deployment of first and second lateral portions and inhibit initial deployment of the central portion for a time period sufficient to cause the knee airbag to deploy away from the housing substantially uniformly across its width.

According to another aspect, the deployment flap can be configured to inhibit initial deployment of the central portion for a time period sufficient to cause the knee airbag to deploy away from the housing substantially uniformly across its width.

According to another aspect, the deployment flap can have a woven fabric construction, and the deployment panel can have an overall generally rectangular shape. The deployment flap can be configured so that a weave direction of the fabric is oblique to a length and width of the deployment panel.

According to another aspect, the weave direction of the fabric can be angled 45±5 degrees relative to the width and height of the deployment flap.

According to another aspect, the housing can have a generally rectangular configuration. The opening can be generally rectangular in shape. The deployment flap, when installed on the housing, can be arranged so that the width of the deployment flap extends parallel to a width of the opening, and the height of the deployment flap extends parallel to a height of the opening.

According to another aspect, the deployment flap can include an upper edge and an opposite lower edge that extend widthwise of the deployment flap. The upper edge can include a series of openings configured to receive hooks or tabs spaced along a width of an upper wall of the housing. The lower edge can include a series of openings configured to receive hooks or tabs spaced along a width of a lower wall of the housing. The deployment flap can extend across the opening of the housing from the upper wall to the lower wall.

According to another aspect, the opening of the housing can have a width for which the deployment flap is configured to cover a central portion thereof. The central portion of the opening that the deployment flap covers can coincide with the central portion of the knee airbag when deflated and stored in the housing. Lateral portions of the opening on opposite sides of the central portion of the opening, which are left uncovered by the deployment flap, can coincide with lateral portions of the knee airbag on opposite sides of the central portion of the knee airbag when deflated and stored in the housing.

According to another aspect, in a deflated and stored condition, the knee airbag can be rolled and/or folded into a package so as to fit in the housing. The airbag package includes the central and lateral portions rolled and/or folded widthwise so that the package has a height sufficient to fit through the height of the opening of the housing. The airbag package also includes the lateral portions rolled and/or folded inward toward the central portion so that the package has a width sufficient to fit within the opening of the housing.

According to another aspect, the deployment flap can be configured to permit substantially unrestricted inflation and deployment of the lateral portions of the knee airbag while initially inhibiting initial deployment of the central portion of the knee airbag.

According to another aspect, the deployment flap can include a tear strip that extends widthwise across the deployment flap. The tear strip can be configured to extend across the opening parallel to the width of the housing so that knee airbag deployment tensions the deployment flap across the tear strip in directions generally perpendicular to the tear strip.

According to another aspect, the tear strip can include a series of openings in the deployment panel that define a series of legs, spaced along the length of the tear strip, that connect an upper portion of the deployment flap to a lower portion of the deployment flap. According to this configuration, rupture of the legs equates to rupture of the tear strip, which releases the upper and lower portions of the deployment flap and thereby releases the central portion of the knee airbag to inflate and deploy from the housing.

According to another aspect, the openings can be configured so that the legs are angled obliquely with respect to the width of the deployment panel and the extent of the tear strip.

According to another aspect, one or more of the openings can have a trapezoidal configuration. Adjacent trapezoidal openings can have adjacent edges that are parallel to each other so as to define a leg therebetween with an obliquely angled configuration.

According to another aspect, the obliquely angled configuration of the legs can result in shear stresses forming on the legs in response to tension applied by the deploying knee airbag across the tear strip in directions generally perpendicular to the tear strip.

According to another aspect, the deployment flap has a woven fabric construction. The deployment panel can have an overall generally rectangular shape and can be configured so that a weave direction of the fabric is oblique to a length and width of the deployment panel. The degree to which the weave direction is oblique to the length and width of the deployment panel, in combination with the angle at which the legs extend, can be configured to tailor the shear stress applied to the legs in response to knee airbag deployment so tear strip rupture occurs once the desired degree of initial deployment of the central portion of the knee airbag is achieved.

According to another aspect, the deployment flap can have a height configured to determine a gap between the deployment flap and the knee airbag when stored in the housing pre-deployment. The height of the deployment flap can be configured to tune the size of the gap in order to determine a deployment delay applied to the central portion of the knee airbag by the deployment flap.

According to another aspect, a vehicle safety system can include the knee airbag module, a sensor configured to sense the occurrence of an event for which deployment of the knee airbag is desired, and a controller configured to actuate the inflator to deploy the knee airbag in response to the sensor.

BRIEF DESCRIPTION OF THE DRAWINGS

The foregoing and other features and advantages of the present disclosure will become apparent to one skilled in the art to which the present disclosure relates upon consideration of the following description of the invention with reference to the accompanying drawings, wherein like reference numerals, unless otherwise described refer to like parts throughout the drawings and in which.

DETAILED DESCRIPTION

Figure 1:
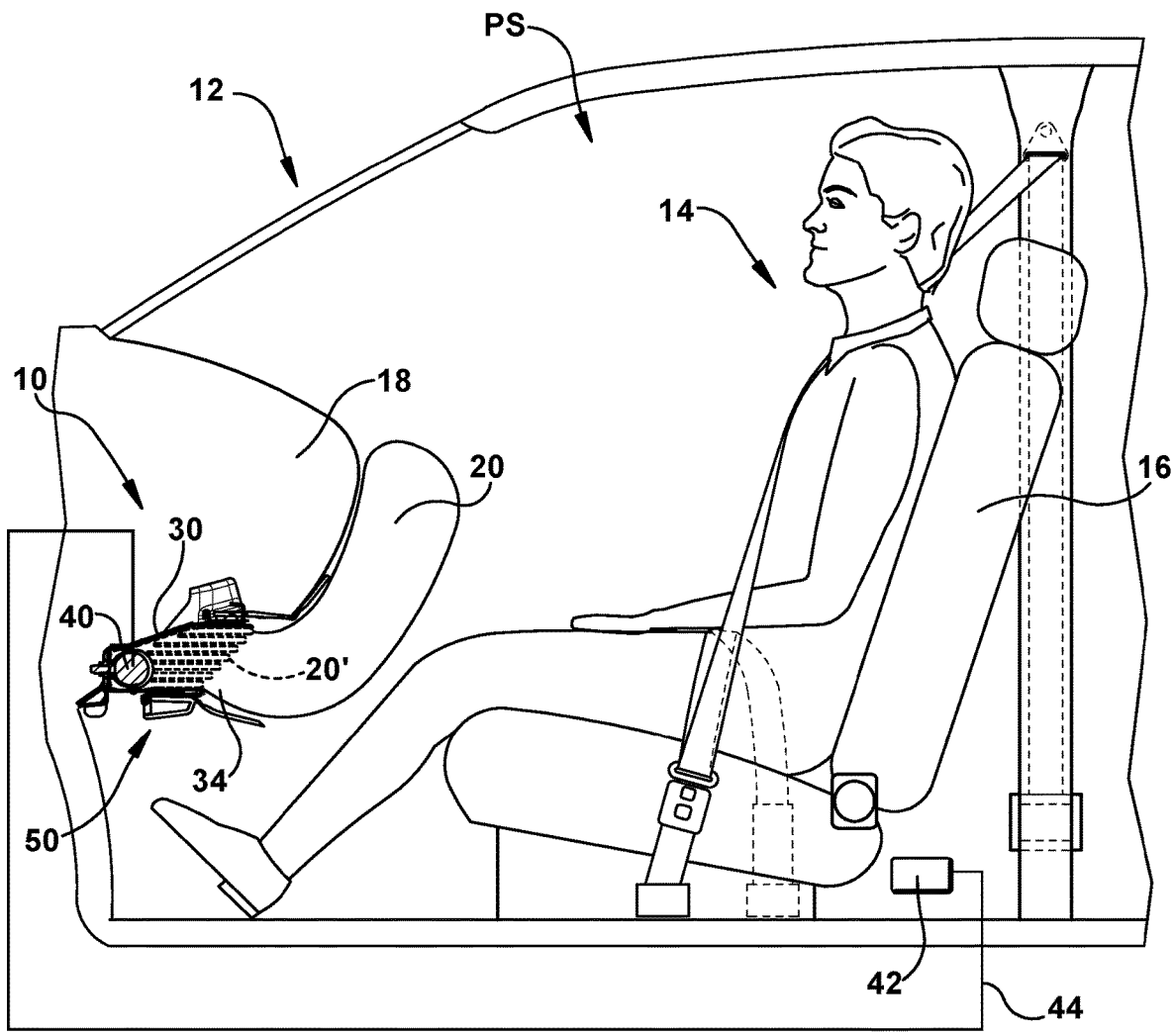
FIG. 1 is a side view that illustrates schematically a vehicle safety system including an apparatus for helping to protect an occupant of a vehicle.

A vehicle safety system and apparatus 10 for helping to protect an occupant 14 of a vehicle 12 is illustrated in FIG. 1. The vehicle safety system and apparatus 10 includes an inflatable vehicle occupant protection device in the form of a knee airbag 20. In the embodiment illustrated in FIG. 1, the knee airbag 20 is a passenger knee airbag for helping to protect the occupant 14 of a seat 16 on a passenger side PS of the vehicle 12. Those skilled in the art will appreciate that the system and apparatus 10 disclosed herein could be adapted for a driver side vehicle occupant (not shown) or occupants of rearward rows of the vehicle 12, such as a $2^{nd}$ row, $3^{rd}$ row, etc., of the vehicle (not shown).

The knee airbag 20 may be part of a knee airbag module 50 that includes a housing 30 and an inflator 40. The knee airbag 20 has a stored condition, indicated by dashed lines in FIG. 1 at 20', in which the knee airbag is folded and placed in the housing 30. The module 50 is mounted to a dash or instrument panel 18 of the vehicle 12. The housing 30 helps contain and support the knee airbag 20 and inflator 40 in the instrument panel 18.

The inflator 40 is actuatable to provide inflation fluid to an inflatable volume of the knee airbag 20 to deploy the knee airbag to the inflated condition, indicated by solid lines in FIG. 1. The inflator 40 may be of any known type, such as a solid propellant or stored gas design, or a hybrid design implementing both solid propellant and stored gas. The apparatus 10 includes a sensor, illustrated schematically at 42, for sensing an event for which inflation of the knee airbag 20 is desired, such as a collision. The inflator 40 is operatively connected to the sensor 42 via lead wires 44.

The knee airbag 20 can be constructed of any suitable material, such as nylon (e.g., woven nylon 6-6 yarns) or polyester, and may be constructed in any suitable manner. For example, the knee airbag 20 may include one or more pieces or panels of material. If more than one piece or panel is used, the pieces or panels may be interconnected by known means, such as stitching, ultrasonic welding, heat bonding, or adhesives, to form the knee airbag 20. The knee airbag 20 may be uncoated, coated with a material, such as a gas impermeable urethane, or laminated with a material, such as a gas impermeable film. The knee airbag 20 thus may have a gas-tight or substantially gas-tight construction. Those skilled in the art will appreciate that alternative materials, such as polyester yarn, and alternatives coatings, such as silicone, may also be used to construct the knee airbag 20.

Figure 5:
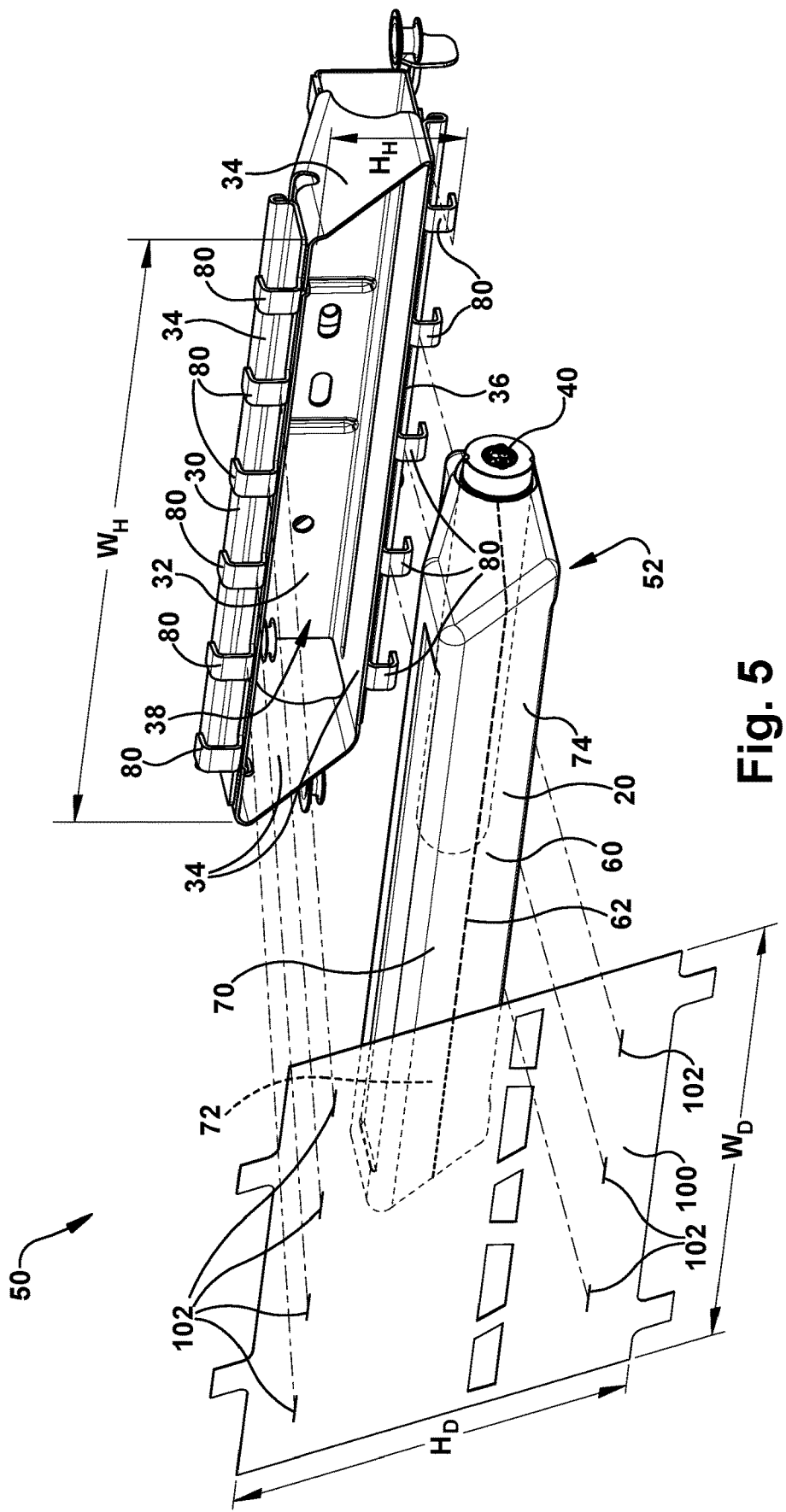

The knee airbag module 50 is illustrated in FIGS. 2-5. The housing 30 stores the knee airbag 20 in the deflated and stored condition. As best shown in FIG. 5, the housing 30 includes a base wall 32 and four sidewalls 34—two long and two short—that extend therefrom and, along with the base wall, define an interior of the housing. Opposite the base wall 32, an annular rim 36 extends along the periphery of the sidewalls 34 and helps define an opening 38 of the housing 30. The housing 30 has a width $W_H$ measured between the short side walls 34, i.e., in the direction of the long side walls. The housing 30 has a height $H_H$ measured between the long side walls 34, i.e., in the direction of the short side walls.

The knee airbag 20 and the inflator 40 form additional components of the knee airbag module 50. The housing 30 is configured to receive the knee airbag 20 and the inflator 40 in the interior of the housing 30. The knee airbag module 50 can also include a fabric wrap 60 for packaging, retaining, and supporting the knee airbag 20 in the deflated and stored condition in the housing 30. The wrap 60 can, for example, be constructed with knee airbag fabric (e.g., nylon or polyester).

To assemble the knee airbag module 50, the inflator 40 is first secured to the knee airbag 20 by positioning the inflator inside the knee airbag while allowing inflator studs 46 to pass through the knee airbag fabric and extend outside the knee airbag. The knee airbag 20 is then rolled and/or folded to a package size capable of fitting in the interior space 28 of the housing 20. The wrap 60 is wrapped around the rolled/folded knee airbag 20 with the inflator 40 installed therein and secured to package the knee airbag for installation in the housing 30.

The wrap 60 can be secured, for example, by installing openings at opposite ends of the wrap over the inflator studs 46 (see FIG. 2) protruding from the knee airbag 20. The airbag package 52, i.e., the knee airbag 20 and inflator 40 packaged in the wrap 60, are then installed in the housing 30. This can be done, for example, by passing the inflator studs 46 through corresponding openings (not shown) in the base wall 32 of the housing and installing fasteners, such as threaded nuts, onto the externally threaded inflator studs.

Figure 6A:
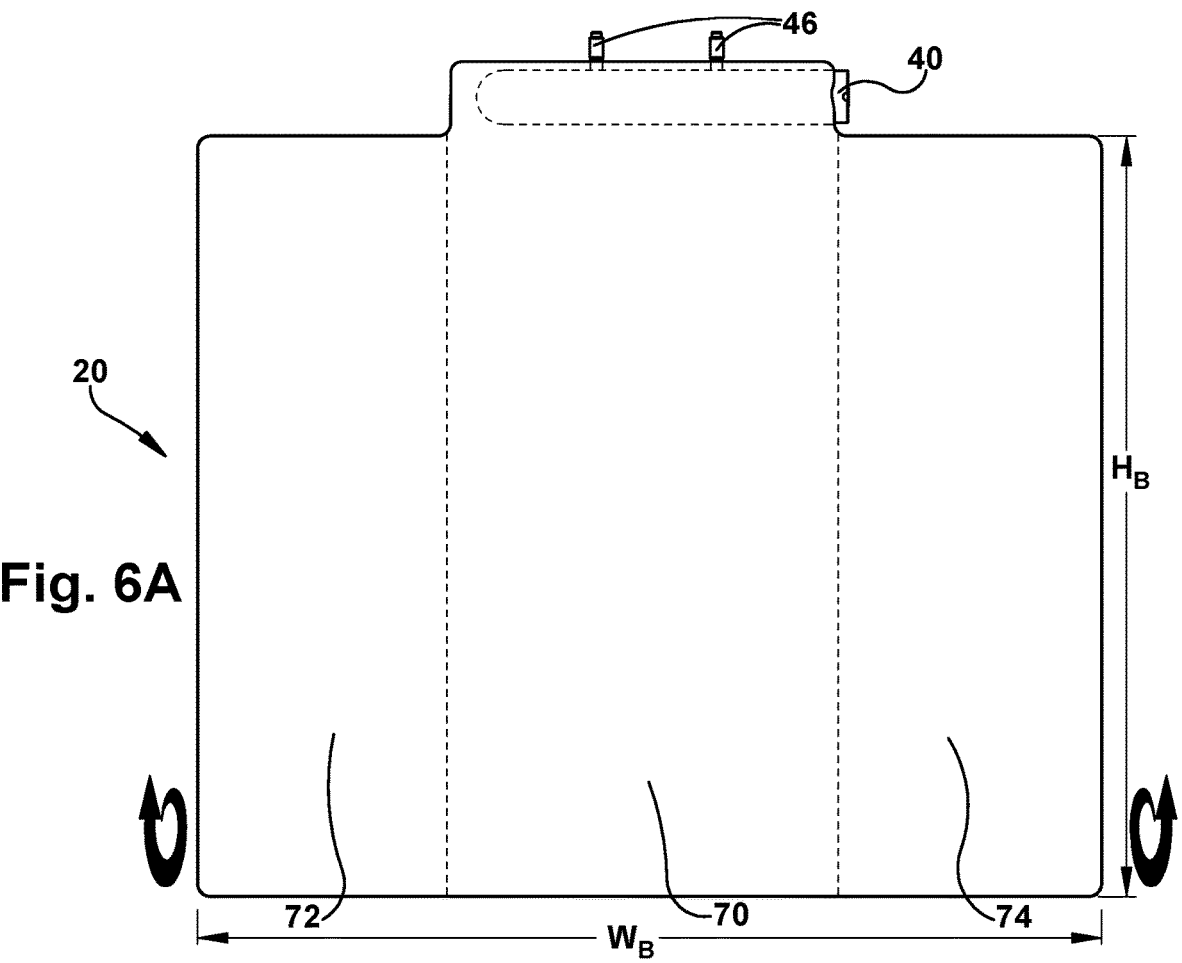
FIGS. 6A-6C are schematic plan views depicting the rolling and/or folding of a knee airbag portion of the apparatus.
Figure 6B:
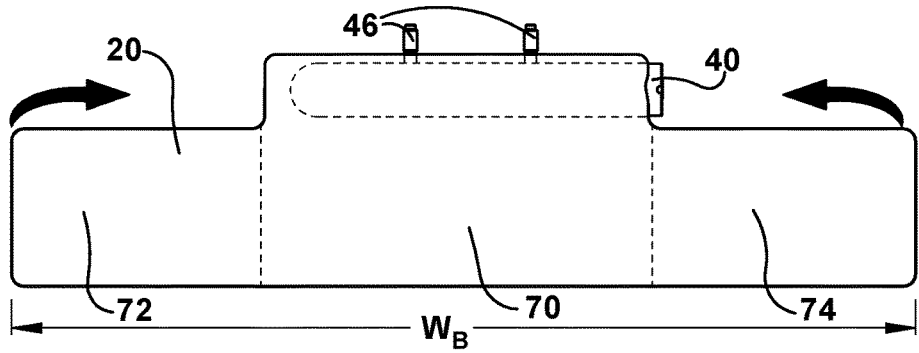
Figure 6C:
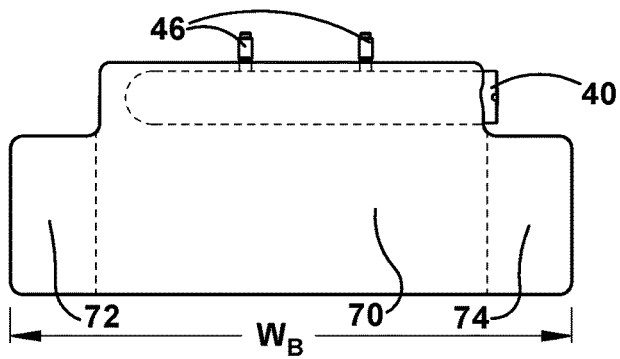

The housing 20 is configured to fit within the available space in the instrument panel 18, which is limited. Because the knee airbag 20, when inflated and deployed, is wider than the width $W_H$ of the housing 20, placing it in the packaged condition in the wrap 60 requires that lateral portions of the knee airbag that extend laterally outside the width $W_H$ of the housing must be rolled, folded, or otherwise positioned inward toward the central portion of the knee airbag that falls within the width of the housing. FIGS. 6A-6C illustrate an example manner in which the knee airbag 20 can be placed in the packaged condition.

As shown in FIG. 6A, the knee airbag 20, with the inflator 40 installed, is placed in a flattened condition. In FIG. 6A, dashed lines are used to delineate a central portion 70 of the knee airbag 20 a first lateral portion 72 of the knee airbag, and a second lateral portion 74 of the knee airbag. In the passenger knee airbag configuration of the knee airbag 20 illustrated herein, the first lateral portion 72 can be an inboard portion of the knee airbag, and the second lateral portion 74 can be an outboard portion of the knee airbag. For purposes of reference in describing this example packaging configuration, the width of the knee airbag 20 is illustrated at $W_B$ in FIG. 6A, and the height of the knee airbag is illustrated at $H_B$ in FIG. 6A.

Referring to FIG. 6B, the knee airbag 20 can be initially rolled and/or folded across its width $W_B$, to reduce its height $H_B$ to a degree sufficient to fit within the height $H_H$ of the housing 30. For instance, in the example configuration of FIG. 6B, this initial roll/fold of the knee airbag 20 can be a fan fold, i.e., a back and forth fold, in which the heights $H_F$ of the folds 62 are configured to fit within the height $H_H$ of the housing 30.

Referring to FIG. 6C, the lateral portions 72, 74 of the folded knee airbag 20 are rolled and/or folded inward toward the center portion 70 to reduce the width $W_B$ of the knee airbag to a degree sufficient to fit within the width $W_H$ of the housing 30. For instance, in the example configuration of FIG. 6C, these inward rolls/folds can be roll folds in which the lateral portions 72, 74 are rolled inward toward the central portion 70 until the width $W_B$ is reduced to a degree sufficient to fit within the width $W_H$ of the housing 30.

Referring back to FIGS. 2-5, the wrap 60 is placed around the rolled/folded knee airbag 20 to place the knee airbag, and the inflator 40 installed within the knee airbag, in the packaged condition. With the wrap 60 installed over the inflator studs 46, the airbag package 52 is ready for installation in the housing 30. The wrap 60 includes tear seams 62 (e.g., a series of perforations in the wrap material) that are rupturable in response to knee airbag inflation to allow the knee airbag 20 to deploy. The tear seams 62 are illustrated schematically by dashed lines. The tear seams 62 can be configured so that they rupture in response to knee airbag deployment forces exerted on the wrap 60 meeting or exceeding a predetermined threshold level.

The knee airbag module 50 also includes a deployment flap 100 for helping to control the deployment of the knee airbag 20 from the housing 30. The deployment flap 100 can, for example, be a fabric flap constructed with knee airbag fabric (e.g., nylon or polyester). The deployment flap 100 is configured to connect to features of the housing 30, such as hooks or clips 80, via corresponding slits or openings 102 in the flap fabric.

The knee airbag module 50 also includes a cover 90 that connects to the housing 30 and/or to support brackets 92 used to facilitate installation of the knee airbag module in the vehicle 12. The cover 90 can be connected to the housing 30 and/or brackets 92 in a variety of manners. In the example configuration of FIGS. 2-5, the cover 90 can be connected to the housing 30 via slots or openings 94 in the cover that cooperate with the hooks 80 on the housing. The cover 90 can also be connected to the brackets 92 via fasteners, such as rivets or threaded fasteners.

The deployment flap 100 has a width $W_D$ configured to partially, substantially, or completely cover the center portion 70 of the packaged knee airbag 20, while leaving the lateral portions 72, 74 of the packaged knee airbag partially, substantially, or completely uncovered. The deployment flap 100 has a height $H_D$ that can be configured so that the connection of the deployment flap to the housing 30 can retain the airbag package 52 in the housing, while leaving some space between the flap and the airbag package to aid in controlling knee airbag deployment, as described below.

Upon the occurrence of an event for which deployment of the knee airbag 20 is desired, such as a vehicle collision or rollover, the sensor 42 provides a signal to the inflator 40 via the lead wires 44. In response to the signal, the inflator 40 is actuated and produces inflation fluid, which is directed into the knee airbag 20 and causes it to inflate and deploy. The inflating knee airbag 20 ruptures the wrap 60 and the deployment flap 100, and also opens the cover 90. The knee airbag 20 is thus released to inflate and deploy to the condition illustrated in FIG. 1, where it is positioned between the occupant's knees/legs and the instrument panel 18. The knee airbag 20, in the inflated and deployed condition, can thus help protect the occupant 14 by cushioning impacts of his/her knees/legs with the instrument panel 18.

Advantageously, the deployment flap 100 is configured to help control deployment of the knee airbag 20 to help maximize the protection afforded to the occupant 14. More specifically, the deployment flap 100 is configured to help ensure that the knee airbag 20 deploys uniformly or substantially uniformly across its width. By this, it is meant that the deployment flap 100 helps control knee airbag deployment so that the lateral portions 72, 74 of the knee airbag deploy toward the occupant 14 at the same time and/or rate. The intended function of the deployment flap 100 is deploy the knee airbag 20 uniformly widthwise toward the occupant 14 so that the central portion 70 and lateral portions 72, 74 reach the occupant's knees/legs at the same time or substantially at the same time.

The intent or purpose of the deployment flap 100 is to avoid the central portion 70 reaching the knees/legs prior to the lateral portions 72, 74 and potentially deploying between the occupant's legs and moving them apart, i.e., away from each other. The deployment flap 100 inhibits or delays the initial deployment of the central portion 70, allowing the lateral portions 72, 74 to get a head start, i.e., begin deploying from the housing 30 first. To do this, the deployment flap 100 is configured to rupture after imparting an initial deployment delay to the central portion 70. The delay imparted to the central portion 70 by the deployment flap 100 need not be long—only a few milliseconds or less, even less than one millisecond—just enough to allow the lateral portions 72, 74 to begin exiting the housing while the central portion is restrained.

The deployment flap 100 owes its function to the realization that the central portion 70, being centrally located on the knee airbag 20, coincides with the position/location of the housing 30. Thus, when the knee airbag is rolled/folded into the airbag package 52 for placement in the housing 30, the central portion 70 is rolled/folded height-wise only, whereas the lateral portions 72, 74 are rolled/folded both height-wise and width-wise. As a result, deployment of the central portion 70 is direct, i.e., height-wise, which means that it deploys directly toward the occupant 14 and the deployed position. At the same time, deployment of the lateral portions 72, 74 is indirect, i.e., it undergoes both height-wise and width-wise deployment, which means that it deploys both laterally from the housing 30 and toward the occupant 14. The deployment delay imparted on the central portion 70 by the deployment flap 100 accounts for the difference in these deployment paths, and helps ensure the desired uniform width-wise knee airbag deployment. Since the delay imparted to the central portion 70 is small—as short as one millisecond or less—the impact on the overall deployment time for the knee airbag 20 can be short and not significant.

To achieve this function, the configuration of the deployment flap 100 is complex. This is because the deployment flap 100 must impart the very short deployment to the central portion 70 in a repeatable and reliable manner. To achieve repeatability and reliability at this level (i.e., down to as much as a millisecond resolution), the rupture strength of the deployment flap 100 must be capable of fine-tuning. Advantageously, the deployment flap 100 is configured to include several features that facilitate fine-tuning its rupture strength.

Figure 7A:
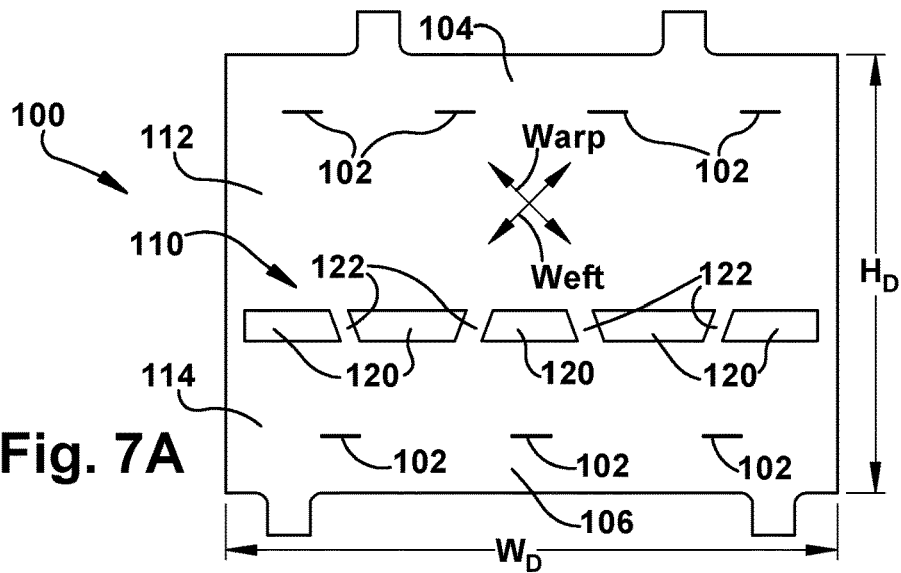
FIGS. 7A-7C are plan views of different example configurations of a portion of the apparatus.
Figure 7B:
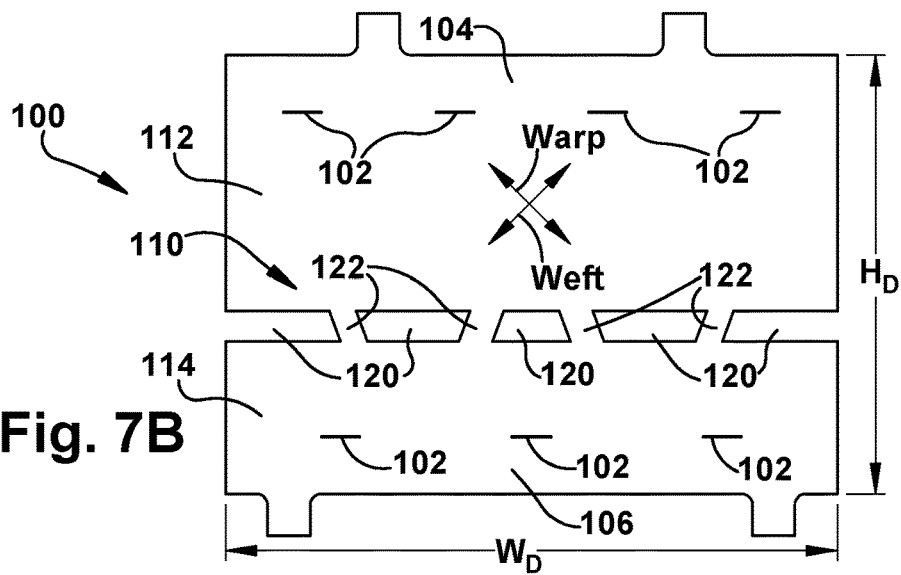
Figure 7C:
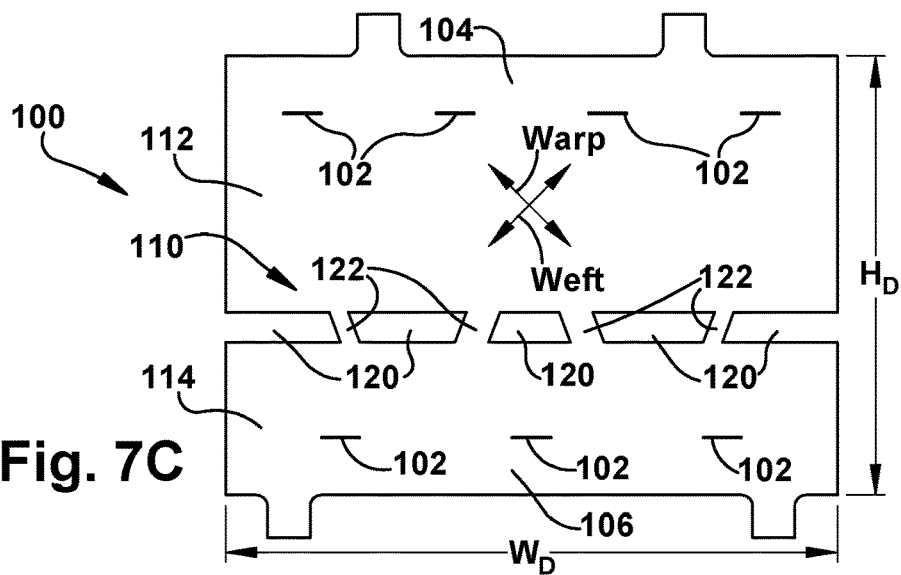

FIGS. 7A-7C illustrate different example configurations of the deployment flap. As shown in FIGS. 7A-7C, the deployment flap 100 can have a generally rectangular overall configuration, with an upper edge portion 104 and a lower edge portion 106 along which the fastener slits/openings 102 are arranged. The deployment flap 100 includes a tear strip 110 that extends laterally across the width of the flap, defining an upper flap portion 112 and a lower flap portion 114. The upper flap portion 112 and lower flap portion 114 are connected by the tear strip 110 and separated from each other when the tear strip ruptures.

The tear strip 110 is defined by a series of cutouts or openings 120, spaced along the length of the tear strip, that are cut from the deployment flap material. The openings 120 leave a series of legs 122 that extend between and connect the upper and lower flap portions 112, 114. In the example configuration of FIG. 5, the openings 120 are trapezoidal in shape, which gives the legs 122 an angled configuration relative to the width $H_D$ and height $H_D$ of the deployment flap 100. Of course, other shapes of the openings 120 could give rise to the configuration of the legs 122.

The legs 122 are rupturable to separate and release the upper and lower flap portions 112, 114 to permit deployment of the central portion 70 of the knee airbag 20. Consequently, it is the rupture strength of the legs 122 that must be tuned to adjust the rupture strength of the deployment flap 100. FIGS. 7A-7C illustrate different example configurations of the openings 120 and the resulting configurations of the legs 122. From FIGS. 7A-7C, it can be seen that the differences in the configurations of the openings 120 changes the shape (e.g., thickness) and number of legs 122 of the tear strip 110.

The deployment flap 100 is a fabric structure constructed, for example, from knee airbag fabric. The fabric can be plain woven, although other weave patterns could be used. As known in the art of weaving, a plain woven fabric is manufactured on a loom with a 1×1 weave pattern, with single warp yarns woven around single weft yarns, and vice versa. In the example configurations of FIGS. 7A-7C, the deployment flap 100 is cut (e.g., laser cut) from a sheet or roll of plain woven fabric.

The deployment flap 100 is constructed so that the weave direction of the fabric is angled relative to the width $W_D$ and height $H_D$ of the flap. The weave direction of the warp and weft yarns are identified by arrows in FIGS. 5-7 that identify the weave. In an example configuration, the weave direction can be rotated 45±5 degrees relative to the width $W_D$ and height $H_D$ of the deployment flap 100.

Advantageously, angling the fabric weave direction obliquely relative to the width $W_D$ and height $H_D$ of the deployment flap 100 facilitates tuning the rupture strength of the tear strip 110. Recalling that the delay imparted to the deployment of the central portion 70 is slight and must be repeatable and reliable, it can be seen that fine-tuning the rupture strength of the tear strip 110 is desirable. The angled weave structure, in combination with the design of the openings and legs 122, allows for fine-tuning the tear strength of the tear strip 110.

The width $W_D$ and height $H_D$ of the deployment flap 100 coincide with the width and height of the knee airbag module as viewed in the installed condition and the width and height of the knee airbag when deployed. The width $W_D$ of the deployment flap 100 also coincides with the direction of the tear strip 110. Deployment of the central portion 70 of the knee airbag 20 exerts an outward force (from the housing 30) on the deployment flap 100. Because the deployment flap 100 is connected to the housing 30 of the knee airbag module 50 via the slits/openings 102 along the upper and lower edges 104, 106, tension in response to knee airbag deployment is applied to the deployment flap along the height $H_D$ of the flap.

Because the tear strip 110 extends widthwise across the deployment flap 100, tension is applied perpendicular to the strip. It can therefore be seen that the tension is applied obliquely to the weave direction of the fabric. This, coupled with the angled configuration of the legs 122, which maintain the connection of the tear strip 110, results in the tension being applied obliquely to the fabric of the legs and to the warp and weft yarns that form its structure.

In a fabric panel structure in which the weave orientation is such that a yarn, warp or weft, is parallel to the tension applied to the panel, the tear strength of the panel is owed primarily to the tensile strength of the yarns oriented in the direction of the tension. Tearing of such panels relies on failure, in tension, of those yarns. Tensile failure of a fabric is, however, unpredictable, as the tensile strength of the fabric is unpredictable. Tearing a fabric by exerting a shear force, i.e., obliquely to the weave direction of the fabric is far more reliable and predictable in terms of the shear force required to produce the tear.

Advantageously, the oblique application of deployment forces to the tear strip 110 results in the legs 122 rupturing in response to shear forces acting on the fabric of the legs. Because the deployment flap 100 is formed with the aforementioned obliquely angled weave direction, failure of the legs 122 and rupture of the tear strip 110 is a result of shear forces acting on the legs. As mentioned, fabric failure due to shear is predictable and reliable. Therefore the rupture strength 110 is predictable and reliable.

Additionally, the rupture strength of the legs 122 individually, and the tear strip 110 collectively, can be fine-tuned by adjusting the configurations of the openings 120 and the resulting configurations of the legs 122. By doing this, the direction of the shear forces and the number of yarns that support the connection between the upper and lower portions 112, 114 of the deployment flap 100 can be tailored. As a result, the tear strip 110 has a tear strength configured so that the deployment flap produces the desired deployment characteristics.

Fine-tuning of the rupture strength can, for example, be achieved by adjusting the length(s), width(s), angle(s), and number of legs 122 included in the tear strip. Adjusting the length, width, and number of the legs 122 can adjust the number of yarns in each leg and, therefore, can help increase or decrease the rupture strength of each leg individually and the tear strip 110 overall. Adjusting the angle of the legs 122 can affect the number of yarns that extend between and interconnect the upper and lower portions 112, 114. Significantly, adjusting the angle of the legs 122, accounting for the weave angle of the fabric, can also affect the strength of shear forces acting on the fabric of the legs 122 in response to tension along the height of the deployment flap 100 in response to knee airbag deployment.

Figure 2:
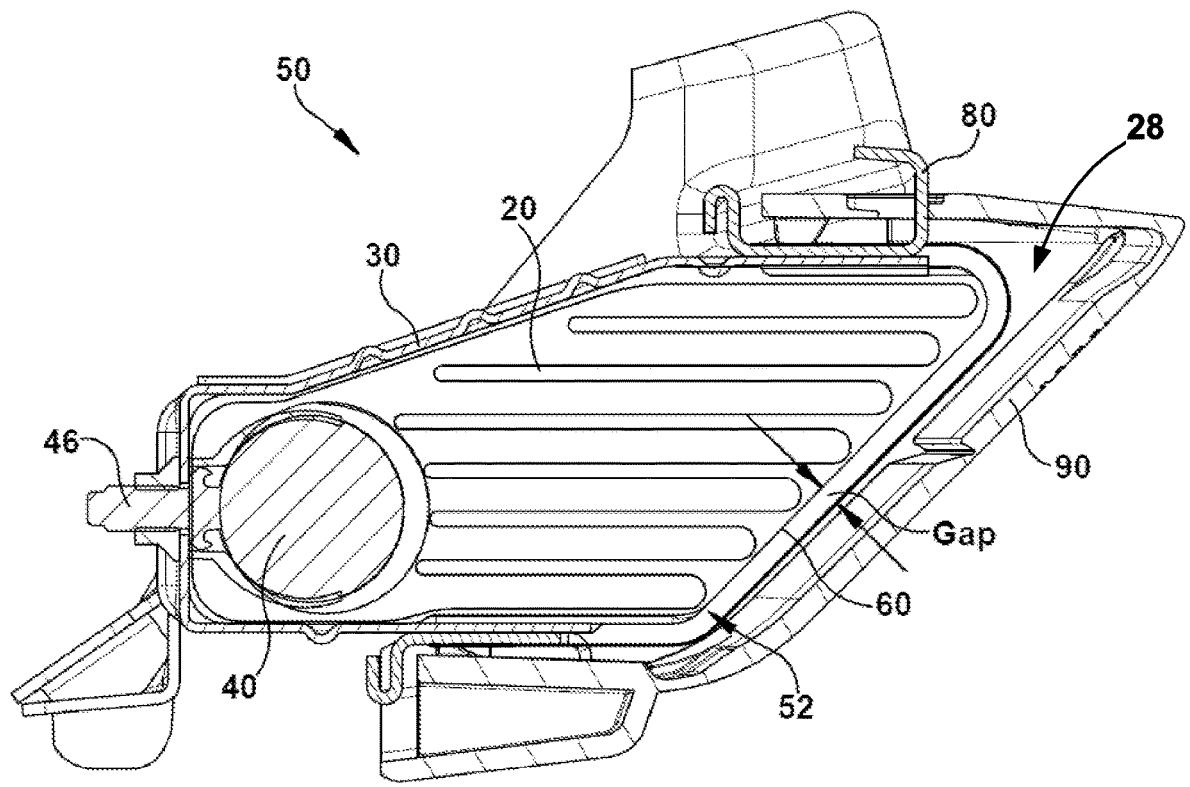
FIG. 2 is a sectional view depicting a portion of the apparatus.
Figure 3:
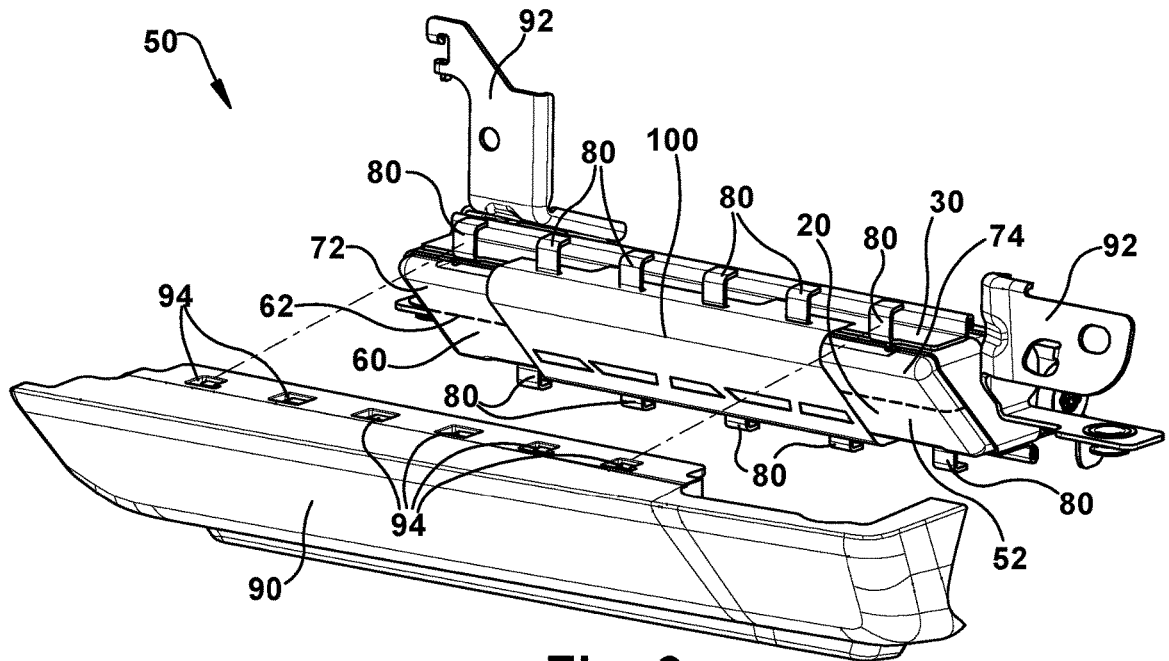
FIGS. 3-5 are partially exploded perspective views depicting portions of the apparatus.
Figure 4:
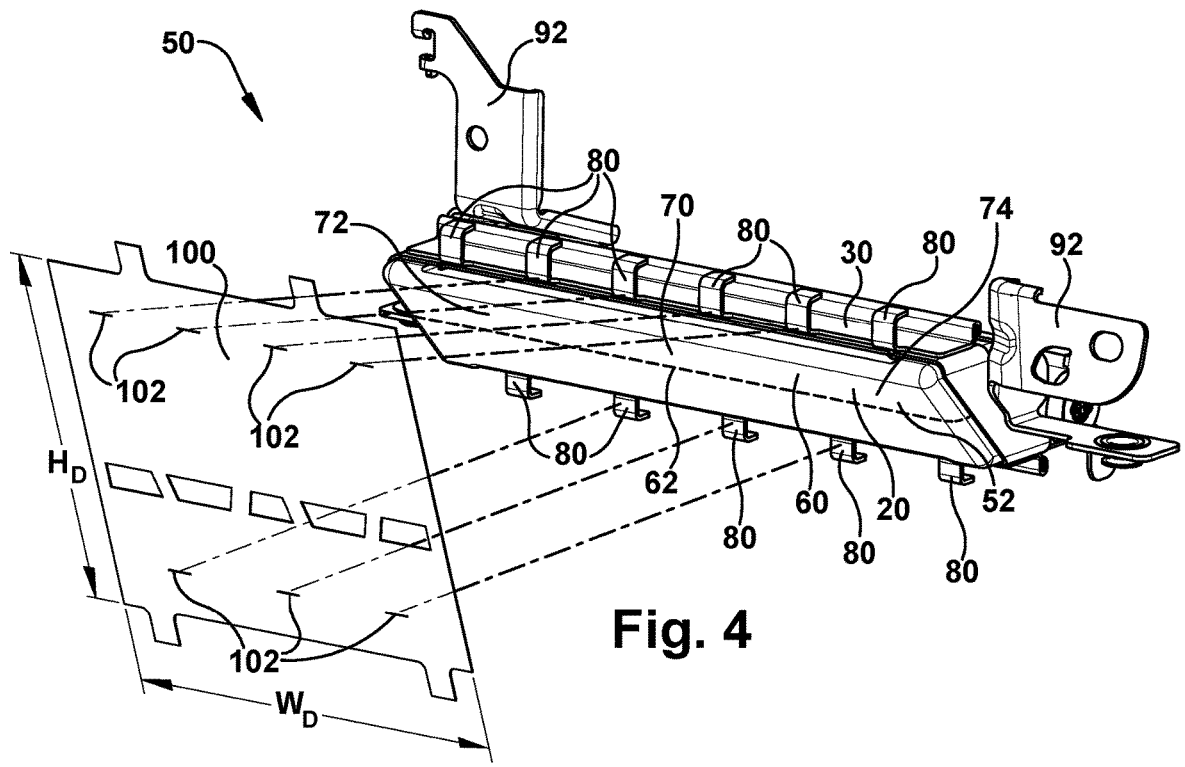

The Height $H_D$ of the deployment flap 100 determines the fit of the deployment flap on the knee airbag module 50. FIG. 2 illustrates a gap between the deployment flap 100 and the airbag package 52 when the deployment flap is installed on the knee airbag module 50. The size of this gap if determined by the height $H_D$ of the deployment flap 100, which dictates how closely it fits with the housing 30 and the airbag package 52 stored therein. The size of the gap determines when during deployment the central portion 70 of the knee airbag 20 engages the deployment flap 100 and, therefore, the timing of the deployment forces that ultimately cause the tear strip 110 to rupture. Because the gap can be so small and the knee airbag deployment so rapid, it follows that the deployment delay applied to the knee airbag 20 by the deployment flap 100 can be adjusted with a high degree of resolution, i.e., millisecond or less resolution, by adjusting the size of the gap through selection of the height $H_D$ of the deployment flap.

The ability to fine-tune the tear strength of the tear strip 110 through the configuration of the openings 120 and legs 122, which is facilitated by the oblique weave angle of the fabric forming the deployment flap 100, allows for tailoring the deployment delay applied to the central portion 70 of the knee airbag 20 with the desired resolution (e.g., millisecond resolution). The resolution of the deployment delay can be further tuned through the configuration of the gap between the deployment flap 100 and the airbag package 52. As a result, the knee airbag module 50 can be configured so that the knee airbag 20 deploys evenly across its width and therefore maximize the protection afforded to the occupant.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

The invention claimed is:

1. A knee airbag module comprising:
   an inflatable knee airbag;
   an inflator for inflating the knee airbag;
   a housing for supporting the knee airbag and inflator, the housing comprising an opening through which the knee airbag deploys;
   a cover for enclosing the knee airbag in the housing; and
   a deployment flap positioned beneath the cover, connected to the housing, and spanning across at least a portion of the opening;
   wherein the knee airbag comprises a central portion that extends across the opening of the housing when the knee airbag is deployed, a first lateral portion that extends laterally from the central portion and laterally of the housing in a first direction when the knee airbag is deployed, and a second lateral portion that extends laterally from the central portion and laterally of the housing in a second direction, opposite the first direction, when the knee airbag is deployed, the central portion and first and second lateral portions defining a width of the knee airbag;
   wherein the deployment flap is configured to initially inhibit deployment of the central portion of the knee airbag while the first and second lateral portions of the knee airbag initially deploy, the deployment flap being configured to thereafter rupture and permit deployment of the central portion, and wherein the deployment flap is configured to inhibit initial deployment of the central portion for a time period sufficient to cause the central portion and the first and second lateral portions to deploy away from the housing uniformly across the width of the knee airbag.

2. The knee airbag module recited in claim 1, wherein the deployment flap has a woven fabric construction, and wherein the deployment flap has an overall generally rectangular shape, wherein the deployment flap is configured so that a weave direction of the fabric is oblique to a length and width of the deployment flap.

3. The knee airbag module recited in claim 2, wherein the weave direction of the fabric is angled 45±5 degrees relative to the width and height of the deployment flap.

4. The knee airbag module recited in claim 2, wherein the housing has a generally rectangular configuration, the opening is generally rectangular in shape, and the deployment flap, when installed on the housing, is arranged so that the width of the deployment flap extends parallel to a width of the opening, and the height of the deployment flap extends parallel to a height of the opening.

5. The knee airbag module recited in claim 1, wherein the deployment flap comprises an upper flap portion and a lower flap portion that extend widthwise of the deployment flap, wherein the upper flap portion comprises a series of openings spaced along an upper edge of the deployment flap configured to receive hooks or tabs spaced along a width of an upper wall of the housing, wherein the lower flap portion comprises a series of openings spaced along a lower edge of the deployment flap configured to receive hooks or tabs spaced along a width of a lower wall of the housing, and the deployment flap extends across the opening of the housing from the upper wall to the lower wall.

6. The knee airbag module recited in claim 5, wherein the opening of the housing has a width for which the deployment flap is configured to cover a central portion thereof, wherein the central portion of the opening that the deployment flap covers coincides with the central portion of the knee airbag when deflated and stored in the housing, and wherein lateral portions of the opening on opposite sides of the central portion of the opening, which are left uncovered by the deployment flap, coincide with the first and second lateral portions of the knee airbag on opposite sides of the central portion of the knee airbag when deflated and stored in the housing.

7. The knee airbag module recited in claim 6, wherein, in a deflated and stored condition, the knee airbag is rolled and/or folded into a package so as to fit in the housing, the airbag package comprising the central portion and the first and second lateral portions rolled and/or folded widthwise so that the package has a height sufficient to fit through the height of the opening of the housing, the airbag package further comprising the first and second lateral portions rolled and/or folded inward toward the central portion so that the package has a width sufficient to fit within the opening of the housing.

8. The knee airbag module recited in claim 6, wherein the deployment flap is configured to permit substantially unrestricted inflation and deployment of the first and second lateral portions of the knee airbag while initially inhibiting initial deployment of the central portion of the knee airbag.

9. The knee airbag module recited in claim 1, wherein the deployment flap comprises a tear strip that extends widthwise across the deployment flap, the tear strip being configured to extend across the opening parallel to the width of the housing so that knee airbag deployment tensions the deployment flap across the tear strip in directions generally perpendicular to the tear strip.

10. The knee airbag module recited in claim 9, wherein the tear strip defines upper and lower portions of the deployment flap positioned on opposite sides of the tear strip, wherein the tear strip comprises portions of material removed from the panel to form a series of openings in the deployment flap that define a series of legs, spaced along the length of the tear strip, that connect the upper portion of the deployment flap to the lower portion of the deployment flap, wherein rupture of the legs equates to rupture of the tear strip, which releases the upper and lower portions of the deployment flap and thereby releases the central portion of the knee airbag to inflate and deploy from the housing.

11. The knee airbag module recited in claim 10, wherein the openings have shapes configured so that the legs are angled obliquely with respect to the width of the deployment flap and the extent of the tear strip.

12. The knee airbag module recited in claim 11, wherein the obliquely angled configuration of the legs results in shear stresses forming on the legs in response to tension applied by the deploying knee airbag across the tear strip in directions generally perpendicular to the tear strip.

13. The knee airbag module recited in claim 10, wherein one or more of the openings have a trapezoidal configuration, and wherein adjacent openings have adjacent edges that are parallel to each other so as to define a leg therebetween with an obliquely angled configuration.

14. The knee airbag module recited in claim 13, wherein the deployment flap has a woven fabric construction, and wherein the deployment flap has an overall generally rectangular shape, wherein the deployment flap is configured so that a weave direction of the fabric is oblique to a length and width of the deployment flap, wherein the degree to which the weave direction is oblique to the length and width of the deployment flap, in combination with the angle at which the legs extend, are configured to tailor the shear stress applied to the legs in response to knee airbag deployment so tear strip rupture occurs once the desired degree of initial deployment of the central portion of the knee airbag is achieved.

15. The knee airbag module recited in claim 1, wherein the deployment flap has a height configured to determine a gap between the deployment flap and the knee airbag when stored in the housing pre-deployment, the height of the deployment flap being configured to tune the size of the gap in order to determine a deployment delay applied to the central portion of the knee airbag by the deployment flap.

16. A vehicle safety system comprising the knee airbag module recited in claim 1 and a sensor configured to sense the occurrence of an event for which deployment of the knee airbag is desired, wherein the inflator is configured to deploy the knee airbag in response to the sensor.

* * * * *